United States Patent Office 3,418,137
Patented Dec. 24, 1968

3,418,137
SHELF-STABLE DUMPLING MIX
Ransom N. Getchell, Santa Monica, and Ralph J. Trickel, Torrance, Calif., assignors to Milani Foods, Inc., Los Angeles, Calif., a corporation of Illinois
No Drawing. Filed June 1, 1965, Ser. No. 460,568
9 Claims. (Cl. 99—94)

ABSTRACT OF THE DISCLOSURE

A dry dumpling and matzo ball mix and batters characterized in that they include, in addition to farinaceous material and shortening, egg solids which are substantially free of egg yolk, and an improved leavening system including a leavening agent which is stable and inactive below a temperature of about 120° F.

---

This invention relates to the preparation of foods commonly known as dumplings, and particularly to the preparation of matzo balls. More specifically, it relates to dry dumpling mixes, batters and dumplings made therefrom, and to methods for producing these batters and dumplings.

Dumplings are generally prepared by mixing a coarsely ground farinaceous material such as cracker metal, bread crumbs, matzo meal, or soy grits, with shortening, eggs, water, salt, seasoning, and leavening to form a dumpling batter. Portions of this batter are then rolled and dropped into boiling water or other liquids such as soup and, after sufficient cooking, dumplings are formed. When the farinaceous material used is matzo meal, the product is commonly called "matzo balls." In the discussion below, frequent reference will be made to "matzo balls"; in all instances, however, unless otherwise indicated, the statements will be equally applicable to dumplings generally.

A typical dry matzo ball mix comprises the following ingredients: matzo meal, shortening, whole egg powder as the proteinaceous binding material, salt, seasoning, sodium bicarbonate as a chemical source of carbon dioxide, and sodium acid pyrophosphate as the acidifying agent. This dry product is then mixed with an equal amount by weight of water to form a batter. Although satisfactory matzo balls can be produced by the use of dry mixes of this type, there are numerous disadvantages inherent therein which have hitherto limited the commercial appeal of these dry mixes. The mix, when freshly prepared, would yield an acceptable product; but it has been found that the mix has a limited shelf-life and deteriorates rapidly with age. Use of prior art matzo ball mixes, even a few weeks old and even when tightly sealed, yields matzo balls having greenish discolorations and soapy taste. Furthermore, this dry product, upon aging, undergoes a loss of leavening power causing the matzo balls to be small and dense, rather than light and "airy." Additionally, even if freshly prepared mixes are used, the batter made therefrom is subject to rapid loss of leavening power, thus requiring immediate preparation of the matzo balls in order to avoid getting a final product of undesirable high density. Even refrigeration of the batter does not prevent this loss of leavening power.

It is an object of this invention to obviate the shortcomings of prior art preparations and to provide a dry matzo ball mix which will yield matzo balls with no undesirable color and taste properties. Other objects are to provide dry matzo ball mixes and matzo ball batters in which the leavening action can be delayed so that leavening power does not dissipate upon aging. Still another object is to provide a method for preparing matzo ball batters in which the leavening action can be controlled and from which color-stable matzo balls having improved taste and appearance can be prepared. Other objects, aims, and advantages of the invention will be apparent from the discussion which follows.

Applicants have made the important discovery that the discoloration and the development of undesirable taste in matzo balls prepared from ordinary matzo ball mixes are due to the presence of egg yolk in the mix. Dry egg yolk in the mix is subject to severe deterioration with age. In accordance with the practice of the instant invention, it has been found that substitution of yolk-free egg powder as the proteinaceous binding material for the egg yolk powder or the whole egg powder previously used eliminates the discoloration and undesirable taste in the final product. In this respect, the invention is not limited to egg white. Any edible albumin which is a heat coagulatable protein is equally effective. This material can be derived from other sources, such as fish or milk.

The loss of leavening power found to occur with aging of ordinary matzo ball mixes and which also occurs when matzo ball batters made from freshly prepared mixes are allowed to stand has been traced to the premature reaction of the sodium bicarbonate with the sodium acid pyrophosphate. This reaction causes an early release of carbon dioxide from the dry powder or from the batter, decreasing the amount of carbon dioxide available during the actual cooking of the matzo balls. An important feature of the present invention is the discovery that use of dicalcium phosphate dihydrate as the acidifying agent prevents the premature leavening action. The efficacy of the dicalcium phosphate dihydrate is related to the fact that this material will not react with sodium bicarbonate until a temperature of about 120° F. is attained. Thus, a dry matzo ball mix containing dicalcium phosphate dihydrate is chemically stable and does not lose its leavening power during storage on grocers' shelves. Similarly a matzo ball batter made from this improved and novel mix can be prepared and stored, e.g. overnight in a refrigerator, and still provide matzo balls of desired light and airy characteristics.

A typical exemplary composition embodying the principles of the present invention is set forth below:

A dry dumpling mix having the following composition was prepared using the following ingredients in the following proportions by weight:

| | Parts |
|---|---|
| Cracker meal | 26¾ |
| Salt | 1¼ |
| Dicalcium phosphate dihydrate | 1 |
| Sodium bicarbonate | ⅓ |
| Partially hydrogenated vegetable shortening | 11 |
| Dried yolk free egg solids | 8⅔ |
| Flavoring | 1 |

This dry mix is unusually stable chemically; there is no loss of leavening power and the mix does not discolor with age, even upon extended storage. Three months after preparation, a sample of the dry mix was combined with an equal weight of water to form a dumpling batter. Portions of this batter were shaped into balls and dropped into boiling water. The dumplings thus prepared were desirably textured, with good flavor and color. They compared favorably with dumplings prepared from a freshly prepared dry mix.

The remaining portion of the dumpling batter was refrigerated overnight, and the next day dumplings were made therefrom in the above described manner. These dumplings were similar in texture, flavor and color to those made previously when the batter had been freshly prepared.

Other dumpling mixes were prepared according to the above formulation, using matzo meal, bread crumbs, and soy grits as the farinaceous base in place of cracker meal.

In all instances, the dumplings obtained were of desirable texture, flavor and color, even though the dry mix used had been stored and held over three months prior to its use. Portions of the batter prepared from these mixes were allowed to stand for periods of up to three days or more. Dumplings made from these batters were also of desirable texture, flavor and color.

Additional dumpling mixes were prepared according to the above described general formulation, using liquid vegetable oil and animal fats as shortening. The resultant dumplings were comparable in quality to those made from mixes containing partially hydrogenated vegetable oil. Thus, the particular shortening used in the formulation is not critical.

Further investigation indicates that the approximate limits of the principal ingredients in dry dumpling mixes of the invention are as follows:

| | Parts |
|---|---|
| Farinaceous base | 20–30 |
| Dicalcium phosphate dihydrate | 0.5–3 |
| Sodium bicarbonate | 0.1–2 |
| Shortening | 5–20 |
| Dried yolk-free egg solids | 7–15 |

Additional ingredients include salt, spices and flavoring.

Dumplings made from these mixes and having the above indicated formulation have been uniformly good in quality and appearance. The mixes do not become discolored with age and no loss of leavening power has been observed. Additionally, dumpling batters prepared from these mixes may be stored for relatively long periods of time with no appreciable loss in leavening power. Dumplings prepared from these mixes are also characterized by lightness, good taste, and pleasing appearance.

Through use of the present invention, it is possible, for the first time, to formulate dry dumpling mixes which are commercially acceptable. Dry dumpling mixes can now be produced which can be shipped for long distances and stored on grocers' shelves for relatively long periods of time without incurring risk of deterioration. Additionally, these mixes allow one to prepare a dumpling batter, portions of which may be kept under refrigeration for future use. The dry mixes of the invention thus are products of great versatility and convenience.

The foregoing description and specific examples are given for clearness of understanding only, and it is expected that certain modifications therein will be obvious to those skilled in the art.

We claim:
1. A substantially egg-yolk-free dry dumpling mix comprising from about 20 to about 30 parts by weight of a coarsely-ground farinaceous material, from about 5 to about 20 parts by weight of an edible shortening, from about 7 to about 15 parts by weight of dry, substantially yolk-free egg solids, from about 0.1 to about 2 parts by weight of sodium bicarbonate, and from about 0.5 to about 3 parts by weight of dicalcium phosphate dihydrate; said dry mix, upon the addition of water, yielding a dumpling batter characterized by improved shelf-life and by chemical stability below a temperature of about 120° F.

2. The composition of claim 1 in which the coarsely-ground farinaceous material is selected from the group consisting of cracker meal, matzo meal, bread crumbs, soy grits and mixtures thereof.

3. The composition of claim 1 in which the coarsely-ground farinaceous material is cracker meal.

4. The composition of claim 1 in which the coarsely-ground farinaceous material is matzo meal.

5. The composition of claim 1 in which the shortening is a vegetable fat.

6. The composition of claim 1 in which the shortening is partially hydrogenated vegetable fat.

7. The composition of claim 1 in which the shortening is animal fat.

8. A batter for making dumplings comprising the mix defined in claim 1 distributed substantially uniformly in equal parts by weight of water.

9. A color-stable substantially egg-yolk-free dry matzo ball mix comprising from about 20 to about 30 parts by weight of matzo meal, from about 5 to about 20 parts by weight of an edible shortening, from about 7 to about 15 parts by weight of dry, substantially yolk-free egg solids, from about 0.1 to about 2 parts by weight of sodium bicarbonate, and from about 0.5 to about 3 parts by weight of dicalcium phosphate dihydrate; said mix, upon addition of water, yielding a batter in which no leavening action occurs below a temperature of about 120° F., said batter being further characterized by enhanced shelf-life.

References Cited

UNITED STATES PATENTS

| 2,810,650 | 10/1957 | Joslin | 99—90 |
| 2,942,988 | 6/1960 | Erekson et al. | 99—95 XR |
| 2,954,297 | 9/1960 | Elsesser et al. | 99—94 |

OTHER REFERENCES

Tucker: "Cereal Science Today," vol. 4, No. 4, April 1959, pp. 91 and 92.

Bellin: "The Jewish Cook Book," Bloch Publishing Co., N.Y., 1950, pp. 361, 362, 366 and 367.

Leonard: "Jewish Cookery," Crown Publishers, N.Y., 1952, p. 50.

RAYMOND N. JONES, *Primary Examiner.*

U.S. Cl. X.R.

340—3